126. STOVES & FURNACES.
Stoves, Cooking, Summer,
Stove top supported.
27
M. F. POTTER.
Portable Furnace.
No. 181.
Reissued Oct. 22, 1850.
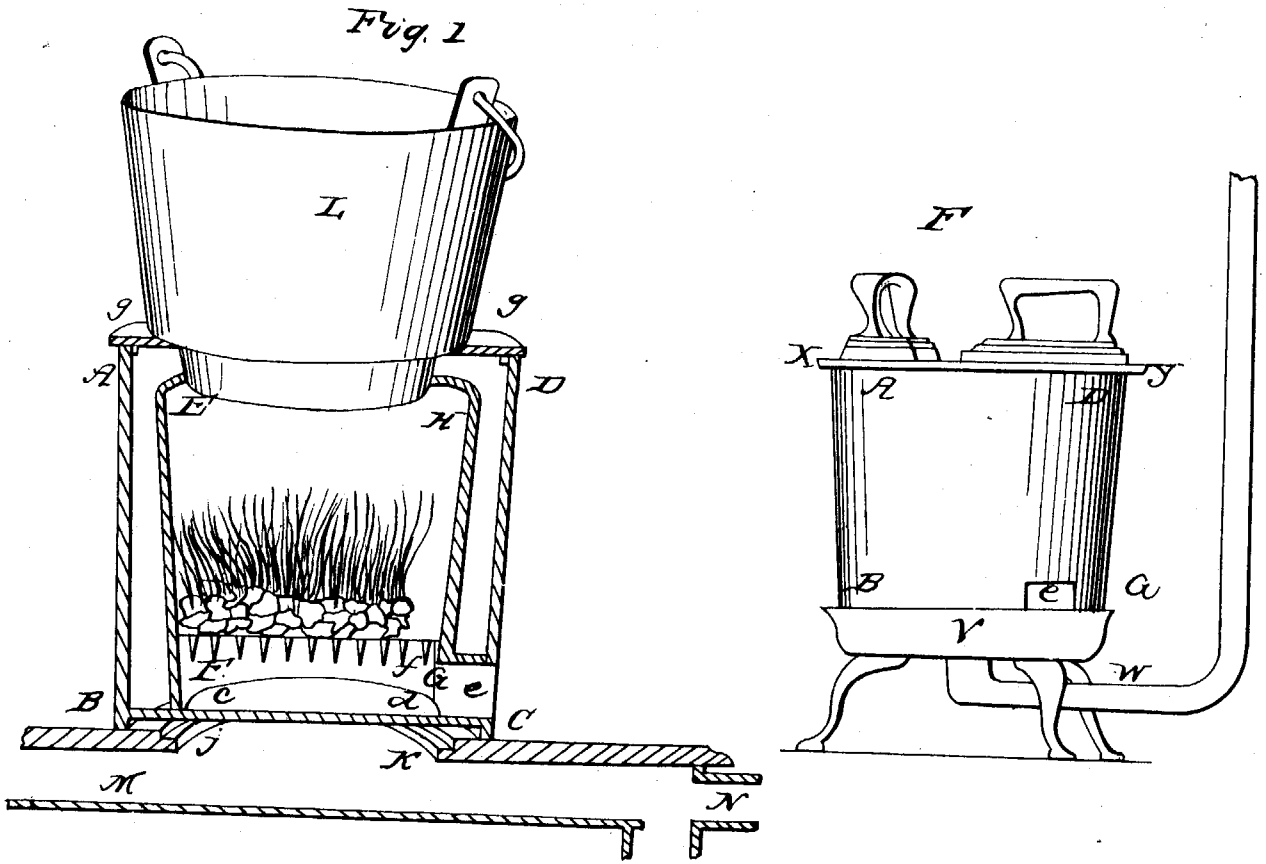
N. PETERS, Photo-Lithographer, Washington, D. C.

MERRITT F. POTTER, OF CHARLEMONT, MASSACHUSETTS.

IMPROVEMENT IN PORTABLE FURNACES.

Specification forming part of Letters Patent No. 7,039, dated January 22, 1850; Reissue No. 181, dated October 22, 1850.

*To all whom it may concern:*

Be it known that I, MERRITT F. POTTER, of Charlemont, in the county of Franklin and State of Massachusetts, have invented a new and improved portable furnace for culinary purposes, which I call "Potter's Summer Furnace," of which the following specification and drawings, forming part of the same, are a full and accurate description.

Figure 1 represents a perspective view of one half of the furnace, the other half being cut off by a vertical section through its center, in order to show its interior. The furnace is standing over one of the boiler-holes of a cooking-stove, a section of whose upper flue is represented by M N. Fig. 2 represents the furnace standing on the bottom vessel when used separately from a cooking stove.

The same letters in both figures refer to the same parts.

The furnace may consist of a cylindrical metal pot, A B C D, in external form like the ordinary portable furnace, but without a bottom. Inside of this is placed a second vessel, E F G H, nearly similar in form. The inner vessel is so placed that its upper edge shall be a small space below that of the outer one, the two being connected together in any convenient way. The inner pot is less in diameter than the outer one, so as to leave a small space all around between the vessels. This space constitutes a descending or diving flue. The inner pot has a close bottom, *c d*, above which is placed a coal-grate, *f f*, and from the space between the bottom and the grate a small air-flue, *e*, passes out through the side of the outer pot. On the top of the outer vessel is placed a ring for receiving the sunk bottoms of culinary vessels. This ring may be furnished with a lid, or exchanged for a flat plate when convenience requires, as shown in Fig. 2. The intention of this furnace is for use in connection with the ordinary cooking or other stove. When, therefore, it is to be used, it is to be placed over one of the boiler or other holes, as shown by J K, Fig. 1. Fire is kindled upon the grate *f f*, and a cooking-vessel placed upon the top. The heat and smoke will pass under the vessel or cover, turn over the top E H, and pass downward into the flue M N of the stove at the boiler or other hole, and thence into the chimney.

In describing my furnace as circular with concentric flue, I do not intend to limit myself to that particular shape, but claim the right to make it of any shape convenience may require, so long as I adhere to the essential feature of my invention—viz., the adaptation of a furnace to the boiler or other hole of a stove as described.

I claim as my invention—

The construction of a portable furnace, by which it may be connected with a stove in the manner described—that is, a furnace adapted to the boiler or other hole of a stove, with a downward draft or diving flue for the escape of the smoke through the bottom into the stove, substantially in the manner and for the purposes set forth.

MERRITT F. POTTER.

Witnesses:

B. SUMNER,

D. H. MASON.